US008700038B2

(12) United States Patent
Wang et al.

(10) Patent No.: US 8,700,038 B2
(45) Date of Patent: Apr. 15, 2014

(54) METHOD AND SYSTEM FOR SIGNALLING THE TRANSFER OF VOICE CALLS BETWEEN ACCESS POINTS IN A WIRELESS LOCAL AREA NETWORK

(75) Inventors: James Wang, Richmond Hill (CA); Rudy Rawlins, Scarborough (CA)

(73) Assignee: BlackBerry Limited, Waterloo, Ontario (CA)

( * ) Notice: Subject to any disclaimer, the term of this patent is extended or adjusted under 35 U.S.C. 154(b) by 1118 days.

(21) Appl. No.: 11/350,943

(22) Filed: Feb. 10, 2006

(65) Prior Publication Data
US 2007/0189217 A1 Aug. 16, 2007

(51) Int. Cl.
*H04W 36/14* (2009.01)
(52) U.S. Cl.
USPC ............. 455/436; 455/414.1; 455/435.1; 455/552.1; 370/331
(58) Field of Classification Search
USPC ............ 370/443–445, 331, 328, 218, 466; 455/421, 436–444, 552, 550, 426, 423
See application file for complete search history.

(56) References Cited

U.S. PATENT DOCUMENTS

| | | | | |
|---|---|---|---|---|
| 5,722,068 | A * | 2/1998 | Bartle et al. | 455/421 |
| 5,995,830 | A * | 11/1999 | Amin et al. | 455/423 |
| 6,445,921 | B1 * | 9/2002 | Bell | 455/426.1 |
| 7,184,415 | B2 * | 2/2007 | Chaney et al. | 370/260 |
| 7,496,672 | B2 * | 2/2009 | Orton et al. | 709/230 |
| 2003/0055975 | A1 * | 3/2003 | Nelson et al. | 709/227 |
| 2003/0133421 | A1 | 7/2003 | Sundar et al. | |
| 2004/0205158 | A1 * | 10/2004 | Hsu | 709/218 |
| 2005/0047435 | A1 | 3/2005 | Segal et al. | |
| 2005/0070288 | A1 * | 3/2005 | Belkin et al. | 455/439 |
| 2005/0070326 | A1 * | 3/2005 | Morton | 455/552.1 |
| 2005/0282575 | A1 | 12/2005 | Dorenbosch | |
| 2005/0286466 | A1 * | 12/2005 | Tagg et al. | 370/329 |

OTHER PUBLICATIONS

Mills-Tettey, G.A. et al., "Mobile Voice Over IP (MVOIP): An Application-Level Protocol for Call Hand-Off in Real Time Applications", Conference Proceedings of the 2002 IEEE International Performance, Computing, and Communications Conference (IPCCC), Phoenix, AZ, Apr. 3-5, 2002, IEEE IPCCC, New York, NY, pp. 271-279, XP010588379, ISBN 0-7803-7371-5.
Pangalos, P.A. et al., "End-to-End Sip Based Real Time Application Adaptation During Unplanned Vertical Handovers", Globecom'01, IEEE Global Telecommunications Conference, San Antonio, TX, Nov. 25-29, 2001, IEEE, New York, NY, pp. 3488-3493, XP010746382, ISBN 0-7803-7206-9.
Cisco Systems, "Cisco Campatible Extensions for WLAN Devices Version 5.0.07", Revision 7, Jan. 10, 2006.
FMCA, "Convergence Services Over Wi-Fi GAN (UMA)", Release 1, Aug. 31, 2005.

* cited by examiner

*Primary Examiner* — Mahendra Patel
(74) *Attorney, Agent, or Firm* — McCarthy Tétrault LLP (57) ABSTRACT

A method for signaling a transfer of a voice call communicated between a wireless device and a second device from a first access point to a second access point in a wireless network, the second device coupled to the first and second access points through a server, the method comprising: receiving at the server from the wireless device a message indicative of a pending transfer between the first and second access points, wherein the wireless device determines whether to send the message by monitoring a characteristic of signals received from each of the first and second access points; and, sending from the server to the second device a message indicative of the pending transfer to thereby prepare the second device for a possible interruption of the voice call.

24 Claims, 6 Drawing Sheets

METHOD AND SYSTEM FOR SIGNALLING THE TRANSFER OF VOICE CALLS BETWEEN ACCESS POINTS IN A WIRELESS LOCAL AREA NETWORK

FIELD OF THE APPLICATION

This application relates to the field of wireless communications between wireless and other devices, and more specifically, to a method and system for signalling the transfer of voice calls between access points in a wireless local area network.

BACKGROUND

Current wireless mobile communication devices include microprocessors, memory, soundcards, and run one or more software applications in addition to providing for voice communications. Examples of software applications used in these wireless devices include micro-browsers, address books, email clients, instant messaging ("IM") clients, and wavetable instruments. Additionally, wireless devices have access to a plurality of services via the Internet. A wireless device may, for example, be used to browse web sites on the Internet, to transmit and receive graphics, and to execute streaming audio and/or video applications. The transfer of Internet content to and from wireless device is typically facilitated by the Wireless Application Protocol ("WAP"), which integrates the Internet and other networks with wireless network platforms. Such wireless devices may operate on a cellular network, on a wireless local area network ("WLAN"), or on both of these types of networks.

With respect to WLANs, the term "Wi-Fi" ("Wireless Fidelity") pertains to certain types of WLANs that use specifications in the Institute of Electrical and Electronics Engineers ("IEEE") 802.11 family. The term Wi-Fi was created by an organization called the Wi-Fi Alliance, which oversees tests that certify product interoperability. The particular specification under which a Wi-Fi network operates is called the "flavour" of the network. Wi-Fi has gained acceptance in many businesses, office buildings, agencies, schools, and homes as an alternative to a wired local area network ("LAN"). All the 802.11 specifications use the Ethernet protocol and Carrier Sense Multiple Access with Collision Avoidance ("CSMA/CA") for path sharing. The original modulation used in 802.11 was phase-shift keying ("PSK"). However, other schemes, such as complementary code keying ("CCK"), are used in some of the newer specifications. The newer modulation methods provide higher data speed and reduced vulnerability to interference. In addition, to improve security, entities running a WLAN often use security safeguards such as encryption or a virtual private network ("VPN").

In a WLAN, an "access point" is a station that transmits and receives data (sometimes referred to as a transceiver). An access point connects users to other users within the network and also can serve as the point of interconnection between the WLAN and a wired LAN. Each access point can serve multiple users within a defined network area. As users move beyond the range of one access point (i.e., when they roam), they are automatically handed over to the next one. A small WLAN may only require a single access point. The number of access points required increases as a function of the number of network users and the physical size of the network.

One problem with communications in a WLAN occurs when a wireless device transfers between first and second access points in the WLAN during voice calls. In particular, when a wireless device user roams around the wireless environment (e.g., a floor in an office building serviced by a WLAN) during a voice call taking place over the WLAN, the wireless connection may not necessarily be always available. For example, if the user is participating in a voice call through his/her wireless device while connected to a first access point to the WLAN and then walks across to the other side of the floor, the user's wireless device may need to transfer over to another access point to continue with the voice call. While it is possible for the transfer between access points to be seamless, there are many occasions when the WLAN coverage is not seamless and hence there will be a period of time when the user's wireless device will be without any wireless connection. Currently, this would mean that the voice call could be interrupted or abruptly dropped.

A need therefore exists for an improved method and system for transferring voice calls between access points in WLANs. Accordingly, a solution that addresses, at least in part, the above and other shortcomings is desired.

BRIEF DESCRIPTION OF THE DRAWINGS

Features and advantages of the embodiments of the present application will become apparent from the following detailed description, taken in combination with the appended drawings, in which.

It will be noted that throughout the appended drawings, like features are identified by like reference numerals.

DETAILED DESCRIPTION OF THE EMBODIMENTS

In the following description, details are set forth to provide an understanding of the application. In some instances, certain software, circuits, structures and techniques have not been described or shown in detail in order not to obscure the application. Embodiments of the present application may be implemented in any computer programming language provided that the operating system of the data processing system provides the facilities that may support the requirements of the application. Any limitations presented would be a result of a particular type of operating system or computer programming language and would not be a limitation of the present application.

According to one embodiment, there is provided a method for signalling a transfer of a voice call communicated between a wireless device and a second device from a first access point to a second access point in a wireless network, the second device coupled to the first and second access points through a server, the method comprising: receiving at the server from the wireless device a message indicative of a pending transfer between the first and second access points, wherein the wireless device determines whether to send the message by monitoring a characteristic of signals received from each of the first and second access points; and, sending from the server to the second device a message indicative of the pending transfer to thereby prepare the second device for a possible interruption of the voice call.

The method may further include, in response to the message from the wireless device, the server ending the call, transferring the call to another device, or placing the call on hold. The wireless network may be a wireless local area network. The second device may be a second wireless device. The second device may be any voice-enabled device (e.g., a wired telephone handset, wireless cellular device, etc.) coupled to the server through a private branch exchange ("PBX"). The server may be a session initiation protocol ("SIP") server and the messages may be SIP messages. The characteristic may be at least one of signal strength, data rate, signal-to-noise ratio, echo level, jitter metric, packet concealment rate, packet loss rate, retransmission rate, and subnet address. The wireless device may be a dual-mode wireless device operable on both the wireless network and a cellular network. And, the method may further include, in response to the message from the wireless device, the server transferring the call to the cellular network.

In accordance with further aspects of the present application there are provided apparatus such as a data processing system and a wireless device, methods for adapting these, as well as articles of manufacture such as a computer readable medium having program instructions recorded therein for practising the method of the application.

Figure 1:
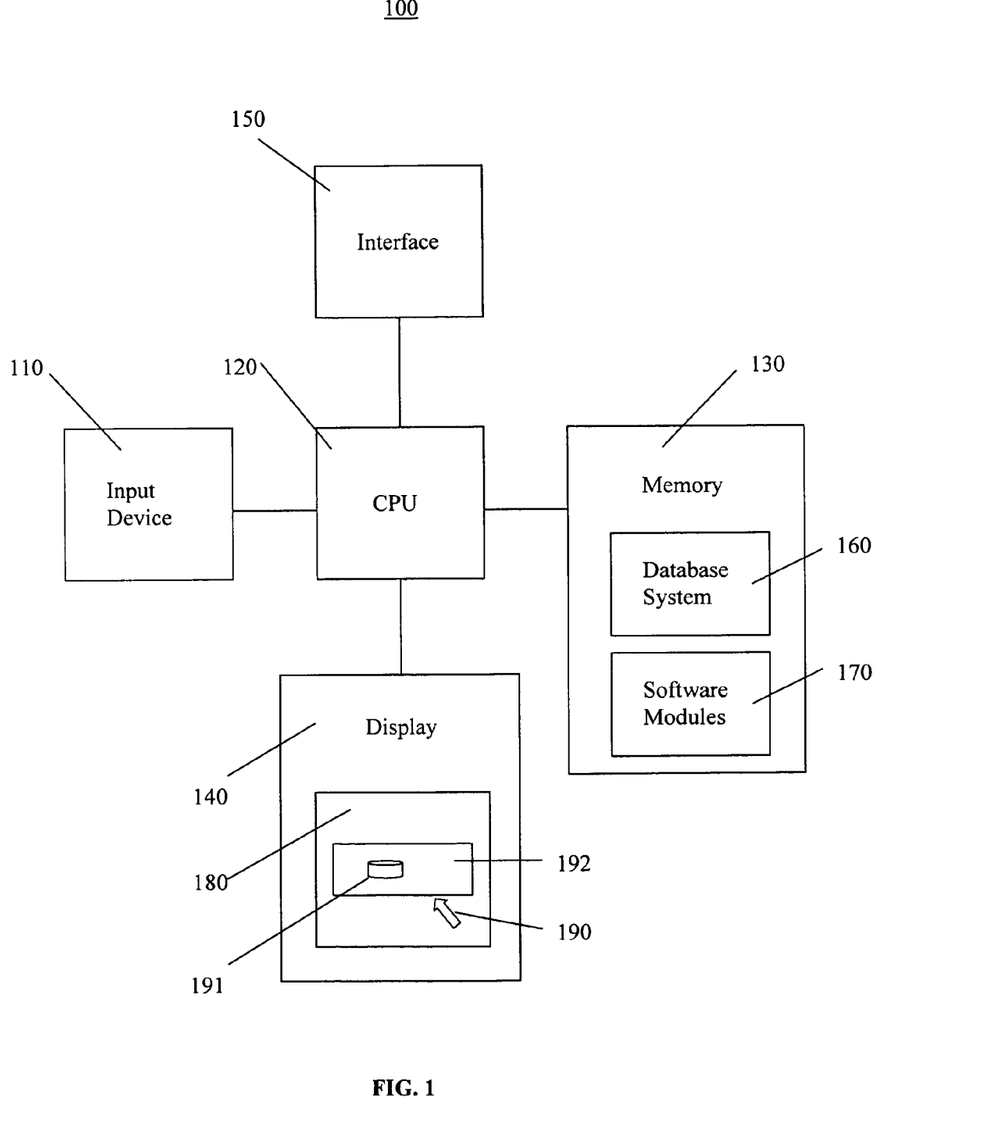
FIG. 1 is a block diagram illustrating a data processing system adapted for implementing an embodiment of the application.

FIG. 1 is a block diagram illustrating a data processing system 100 adapted for implementing an embodiment of the application. The data processing system 100 includes an input device 110, a central processing unit or CPU 120, memory 130, a display 140, and an interface 150. The input device 110 may include a keyboard, mouse, trackball, remote control, or similar device. The CPU 120 may include dedicated coprocessors and memory devices. The memory 130 may include RAM, ROM, or disk devices. The display 140 may include a computer screen, terminal device, or a hardcopy producing output device such as a printer or plotter. And, the interface 150 may include a network connection including an Internet connection and a wireless network 220 connection (see FIG. 2). The data processing system 100 is adapted for communicating with wireless devices 210 over a wireless network 220.

The data processing system 100 may be a server system or a personal computer ("PC") system. The CPU 120 of the system 100 is operatively coupled to memory 130 which stores an operating system (not shown), such as IBM Corporation's OS/2™, UNIX, etc., for general management of the system 100. The interface 150 may be used for communicating to external data processing systems (e.g., PBX 450 in FIG. 4) through a network (such as the Internet) or wireless network 220 (see FIG. 2). Examples of suitable platforms for the system 100 include iSeries™ servers and ThinkCentre™ personal computers available from IBM Corporation. The system 100 may include application server software (not shown), such as WebLogic® Server available from BEA Systems, Inc., for developing and managing distributed applications.

The data processing system 100 may include a database system 160 for storing and accessing programming information. The database system 160 may include a database management system ("DBMS") and a database and is stored in the memory 130 of the data processing system 100.

The data processing system 100 includes computer executable programmed instructions for directing the system 100 to implement the embodiments of the present application. The programmed instructions may be embodied in one or more software modules 170 resident in the memory 130 of the data processing system 100. Alternatively, the programmed instructions may be embodied on a computer readable medium (such as a CD disk or floppy disk) which may be used for transporting the programmed instructions to the memory 130 of the data processing system 100. Alternatively, the programmed instructions may be embedded in a computer-readable signal or signal-bearing medium that is uploaded to a network by a vendor or supplier of the programmed instructions, and this signal or signal-bearing medium may be downloaded through the interface 150 to the data processing system 100 from the network by end users or potential buyers.

The CPU 120 of the system 100 is typically coupled to one or more devices 110 for receiving user commands or queries and for displaying the results of these commands or queries to the user on a display 140. As mentioned, the memory 130 may include a variety of storage devices including internal memory and external mass storage typically arranged in a hierarchy of storage as understood to those skilled in the art.

A user may interact with the data processing system 100 and its software modules 170 using a graphical user interface ("GUI") 180. The GUI 180 may be web-based and may be used for monitoring, managing, and accessing the data processing system 100. GUIs are supported by common operating systems and provide a display format which enables a user to choose commands, execute application programs, manage computer files, and perform other functions by selecting pictorial representations known as icons, or items from a menu through use of an input or pointing device such as a mouse 110. In general, a GUI is used to convey information to and receive commands from users and generally includes a variety of GUI objects or controls, including icons, toolbars, drop-down menus, text, dialog boxes, buttons, and the like. A user typically interacts with a GUI 180 presented on a display 140 by using an input or pointing device (e.g., a mouse) 110 to position a pointer or cursor 190 over an object 191 and by "clicking" on the object 191.

Typically, a GUI based system presents application, system status, and other information to the user in "windows" appearing on the display 140. A window 192 is a more or less rectangular area within the display 140 in which a user may view an application or a document. Such a window 192 may be open, closed, displayed full screen, reduced to an icon, increased or reduced in size, or moved to different areas of the display 140. Multiple windows may be displayed simultaneously, such as: windows included within other windows, windows overlapping other windows, or windows tiled within the display area.

Figure 2:
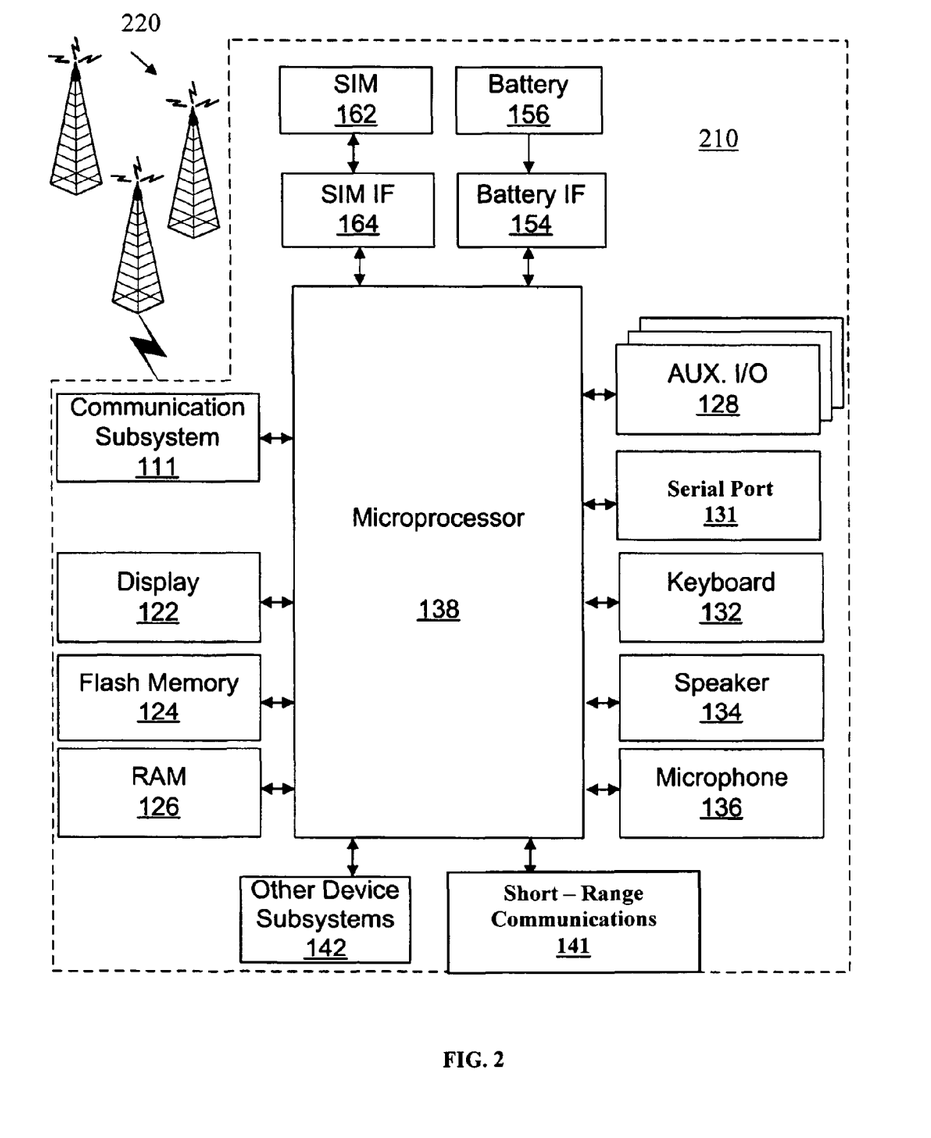
FIG. 2 is a block diagram illustrating a wireless device and a wireless communications system adapted for implementing an embodiment of the application.

FIG. 2 is a block diagram illustrating a wireless device 210 and a wireless network 220 adapted for implementing an embodiment of the application. The wireless network 220 includes antenna, base stations, and supporting radio equipment, known to those of ordinary skill in the art, for supporting wireless communications between the wireless device 210 and the data processing system 100. The wireless network 220 may be coupled to a wireless network gateway (e.g., firewall/VPN 420 in FIG. 4) and to a local area network (e.g., wired LAN 430 in FIG. 4) to which the data processing system 100 may be coupled through its interface 150.

The wireless device 210 is a two-way communication device having at least voice and advanced data communication capabilities, including the capability to communicate with other computer systems 100. Depending on the functionality provided by the device 210, it may be referred to as a data messaging device, a two-way pager, a cellular telephone with data messaging capabilities, a wireless Internet appliance, a data communication device (with or without telephony capabilities), a Wi-Fi device, a WLAN device, or a dual-mode (i.e., Wi-Fi and cellular) device. The device 210 may communicate with any one of a plurality of fixed transceiver stations (e.g., 410 in FIG. 4) within its geographic coverage area.

The wireless device 210 will normally incorporate a communication subsystem 111, which includes a RF receiver, a RF transmitter, and associated components, such as one or more (preferably embedded or internal) antenna elements, local oscillators ("LOs"), and a processing module such as a digital signal processor ("DSP") (all not shown). As will be apparent to those skilled in the field of communications, the particular design of the communication subsystem 111 depends on the communication network 220 in which the device 210 is intended to operate.

Cellular network access may be associated with a subscriber or user of the device 210 and therefore the device 210 typically has a Subscriber Identity Module (or "SIM" card) 162 to be inserted in a SIM interface ("IF") 164 in order to operate on the network (e.g., a GSM network).

The device 210 is a battery-powered device so it also includes a battery IF 154 for receiving one or more rechargeable batteries 156. Such a battery 156 provides electrical power to most if not all electrical circuitry in the device 210, and the battery IF 154 provides for a mechanical and electrical connection for it. The battery IF 154 is coupled to a regulator (not shown) which provides power to the circuitry of the device 210.

The wireless device 210 includes a microprocessor 138 which controls overall operation of the device 210. Communication functions, including at least data and voice communications, are performed through the communication subsystem 111. The microprocessor 138 also interacts with additional device subsystems such as a display 122, a flash memory 124 or other persistent store, a random access memory ("RAM") 126, auxiliary input/output ("I/O") subsystems 128, a serial port (e.g., a universal serial bus ("USB") port) 131, a keyboard 132, a clickable thumbwheel (not shown), a speaker 134, a microphone 136, a short-range communications subsystem 141, and any other device subsystems generally designated at 142. Some of the subsystems shown in FIG. 2 perform communication-related functions, whereas other subsystems may provide "resident" or on-device functions. Notably, some subsystems, such as the keyboard 132, display 122, and clickable thumbwheel, for example, may be used for both communication-related functions, such as entering a text message for transmission over a communication network, and device-resident functions such as a calculator or task list. Operating system software used by the microprocessor 138 is preferably stored in a persistent store such as the flash memory 124, which may alternatively be a read-only memory ("ROM") or similar storage element (not shown). Those skilled in the art will appreciate that the operating system, specific device applications, or parts thereof, may be temporarily loaded into a volatile store such as RAM 126.

The microprocessor 138, in addition to its operating system functions, preferably enables execution of software applications on the device 210. A predetermined set of applications which control basic device operations, including at least data and voice communication applications, will normally be installed on the device 210 during its manufacture. A preferred application that may be loaded onto the device 210 may be a personal information manager ("PIM") application having the ability to organize and manage data items relating to the user such as, but not limited to, instant messaging ("IM"), email, calendar events, voice mails, appointments, and task items. Naturally, one or more memory stores are available on the device 210 and SIM 162 to facilitate storage of PIM data items and other information.

The PIM application preferably has the ability to send and receive data items via the wireless network 220. In a preferred embodiment, PIM data items are seamlessly integrated, synchronized, and updated via the wireless network, with the wireless device user's corresponding data items stored and/or associated with a host computer system such as the data processing system 100 (or server 440 in FIG. 4) thereby creating a mirrored host computer on the device 210 with respect to such items. This is especially advantageous where the host computer system is the wireless device user's office computer system. Additional applications may also be loaded onto the device 210 through the network 220, the auxiliary I/O subsystem 128, the serial port 131, the short-range communications subsystem 141, or any other suitable subsystem 142, and installed by a user in RAM 126 or preferably in a non-volatile store (not shown) for execution by the microprocessor 138. Such flexibility in application installation increases the functionality of the device 210 and may provide enhanced on-device functions, communication-related functions, or both. For example, secure communication applications may enable electronic commerce functions and other such financial transactions to be performed using the wireless device 210.

In a data communication mode, a received signal such as a text message, an email message, or web page download will be processed by the communication subsystem 111 and input to the microprocessor 138. The microprocessor 138 will preferably further process the signal for output to the display 122 and/or to the auxiliary I/O device 128. A user of the wireless device 210 may also compose data items, such as email messages, for example, using the keyboard 132 in conjunction with the display 122, the clickable thumbwheel, and possibly the auxiliary I/O device 128. The keyboard 132 is preferably a complete alphanumeric keyboard and/or a telephone-type keypad. These composed items may be transmitted over a communication network 220 through the communication subsystem 111 or the short range communication subsystem 141.

For voice communications, the overall operation of the wireless device 210 is substantially similar, except that the received signals would be output to the speaker 134 and signals for transmission would be generated by the microphone 136. Alternative voice or audio I/O subsystems, such as a voice message recording subsystem, may also be implemented on the device 210. Although voice or audio signal output is preferably accomplished primarily through the speaker 134, the display 122 may also be used to provide, for example, an indication of the identity of a calling party, duration of a voice call, or other voice call related information.

The serial port 131 shown in FIG. 2 is normally implemented in a personal digital assistant ("PDA")-type communication device for which synchronization with a user's desktop computer is a desirable, albeit optional, component. The serial port 131 enables a user to set preferences through an external device or software application and extends the capabilities of the device 210 by providing for information or software downloads to the device 210 other than through a wireless communication network 220. The alternate download path may, for example, be used to load an encryption key onto the device 210 through a direct and thus reliable and trusted connection to thereby provide secure device communication.

The short-range communications subsystem 141 shown in FIG. 2 is an additional optional component which provides for communication between the device 210 and different systems or devices, which need not necessarily be similar devices. For example, the subsystem 141 may include an infrared device and associated circuits and components, or a Bluetooth™ communication module to provide for communication with similarly-enabled systems and devices. (Bluetooth™ is a registered trademark of Bluetooth SIG, Inc.)

Figure 3:
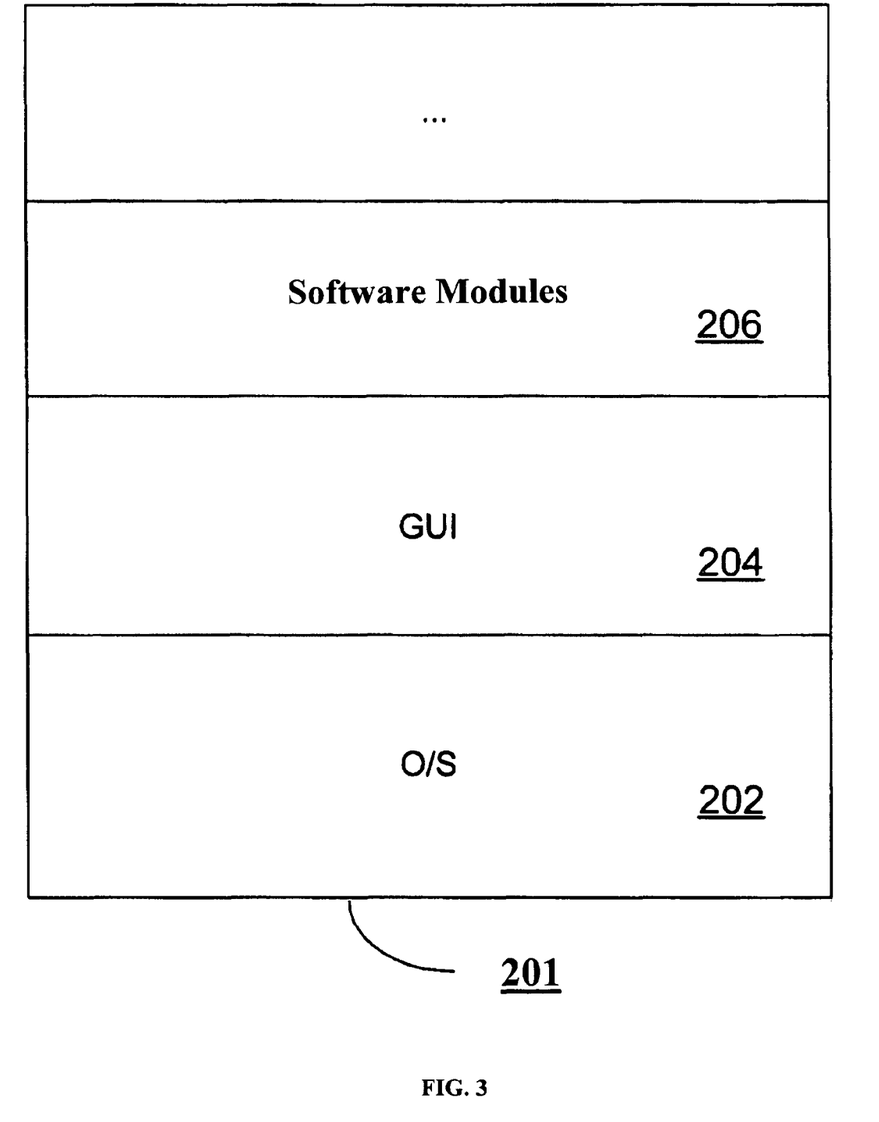
FIG. 3 is a block diagram illustrating a memory of the wireless device of FIG. 2.

FIG. 3 is a block diagram illustrating a memory 201 of the wireless device 210 of FIG. 2. The memory 201 has various software components for controlling the device 210 and may include flash memory 124, RAM 126, or ROM (not shown), for example. In accordance with an embodiment of the invention, the wireless device 210 is intended to be a multi-tasking wireless communications device configured for sending and receiving data items and for making and receiving voice calls. To provide a user-friendly environment to control the operation of the device 210, an operating system ("O/S") 202 resident on the device 210 provides a basic set of operations for supporting various applications typically operable through a graphical user interface ("GUI") 204. For example, the O/S 202 provides basic input/output system features to obtain input from the auxiliary I/O 128, the keyboard 132, the clickable thumbwheel, and the like, and for facilitating output to the user. Though not shown, one or more applications for managing communications or for providing personal digital assistant like functions may also be included. In accordance with an embodiment of the application, there are provided software modules 206 for facilitating the transfer of voice calls between access points on WLANs as will be described below.

Thus, the wireless device 210 includes computer executable programmed instructions for directing the device 210 to implement the embodiments of the present application. The programmed instructions may be embodied in one or more software modules 206 resident in the memory 201 of the wireless device 210. Alternatively, the programmed instructions may be embodied on a computer readable medium (such as a CD disk or floppy disk) which may be used for transporting the programmed instructions to the memory of the wireless device 210. Alternatively, the programmed instructions may be embedded in a computer-readable signal or signal-bearing medium that is uploaded to a network by a vendor or supplier of the programmed instructions, and this signal or signal-bearing medium may be downloaded through an interface 111, 131, 141 to the wireless device 210 from the network by end users or potential buyers.

Figure 4:
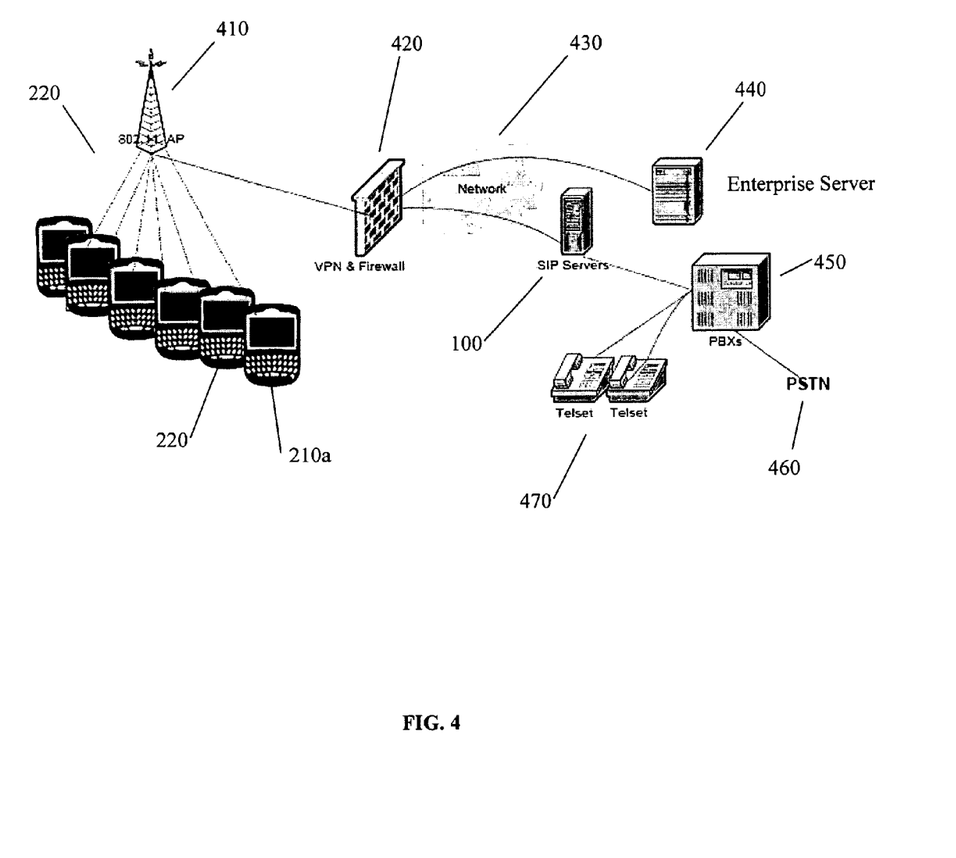
FIG. 4 is a block diagram illustrating a wireless local area network ("WLAN") coupled to a wired LAN in accordance with an embodiment of the application.

FIG. 4 is a block diagram illustrating a wireless local area network ("WLAN") 220 coupled to a wired LAN 430 in accordance with an embodiment of the application. One or more wireless devices 210, each adapted for WLAN operation, communicate over the wireless network 220 to one or more WLAN access points 410. The access point 410 is typically an IEEE 802.11 (i.e., Wi-Fi) radio receiver/transmitter (or transceiver) and functions as a bridge between the WLAN 220 and the wired LAN 430. For security, each access point 410 may be communicatively coupled to the wired LAN 430 through a firewall and/or VPN 420.

On the wired LAN side of the firewall/VPN 420 is at least one data processing system 100 configured to operate as a Session Initiation Protocol ("SIP") server or SIP proxy server. The SIP proxy server 100 is a call server that negotiates a call setup on the user's behalf. For example, the server 100 provides information to indicate whether a party participating in the call is absent, busy, forwarded, or not taking calls. The SIP proxy server 100 is coupled to a private branch exchange ("PBX") 450 to which is coupled one or more telephone handsets 470 and an interface to the public switched telephone network ("PSTN") 460. The PBX 450 is a telephone system within an enterprise that switches calls between enterprise users on local lines while allowing all users to share a certain number of external phone lines coupled to the PSTN 460. Typically, the SIP proxy server 100 is located at the enterprise customer premises, much the same as the PBX 460 is located on site.

In general, the SIP proxy server 100 is not tied into the cellular network directly. However, to provide cellular telephone services such as email service, etc., the wireless devices 210 may have access to email enterprise server 440 located on the wired LAN 430. The email enterprise server 440 may have a hardware configuration similar to that of the SIP proxy server 100. Accordingly, the wireless device 210 may be a simple Wi-Fi device or it may be a more sophisticated dual-mode device including both Wi-Fi and cellular functionality.

According to one embodiment, the wireless devices 210 may be dual-mode devices having both Wi-Fi and cellular functionality. In this embodiment, the wireless devices 210 are also able to communicate over a cellular network (not shown), such as a GSM network, linked to the wired LAN 430. This effectively extends coverage to an unlimited geographical area forming a generic access network ("GAN").

Thus, a user of a wireless device 210 may engage in a telephone voice call with other wireless device 210 users or with the user of a wired telephone handset 470 or with a user on the PSTN 460, all through the WLAN or wireless network 220 coupled through the access point 410 to the SIP proxy server 100 on the wired LAN 430.

As mentioned above, the SIP proxy server 100 is a call server that negotiates a call setup on the user's behalf. The SIP server 100 uses SIP for the signalling used to setup a voice call. Much like an operator-assisted call, SIP provides for the messages each end exchanges to determine what device 210, 470 is to called, whether that device 210, 470 is available, etc.

In particular, the Session Initiation Protocol ("SIP") is an Internet Engineering Task Force ("IETF") standard protocol for initiating an interactive user session that involves multimedia elements such as voice, video, chat, gaming, and virtual reality. Like the hypertext transfer protocol ("HTTP") or the simple mail transfer protocol ("SMTP"), SIP works in the Application layer of the Open Systems Interconnection ("OSI") communications model. The Application layer is the level responsible for ensuring that communication is possible. SIP can establish multimedia sessions or Internet telephony calls, and modify, or terminate them. The protocol can also invite participants to unicast or multicast sessions that do not necessarily involve the initiator. Because the SIP supports name mapping and redirection services, it makes it possible for users to initiate and receive communications and services from any location, and for networks to identify the users wherever they are.

In more detail, SIP is a client-server protocol, dealing with requests from clients 210 and responses from servers 100.

Participants are identified by SIP uniform resource locators ("URLs"). Requests can be sent through any transport protocol, such as the user datagram protocol ("UDP"), the stream control transmission protocol ("SCTP"), or the transmission control protocol ("TCP"). SIP determines the end system to be used for the session, the communication media and media parameters, and the called party's desire to engage in the communication. Once these are assured, SIP establishes call parameters at either end of the communication, and handles call transfer and termination. The Session Initiation Protocol is specified in IETF Request for Comments ("RFC") 2543.

The following is the content of a typical SIP message in which user Alice in Atlanta is calling user Bob in Biloxi:
// Invite goes out to Bob or his proxy to take a call
INVITE sip:bob@biloxi.com SIP/2.0
Via: SIP/2.0/UDP pc33.atlanta.com; branch=z9hG4bK776asdhds
Max-Forwards: 70
To: Bob<sip:bob@biloxi.com>
From: Alice <sip:alice@atlanta.com>;tag=1928301774
Call-ID: a84b4c76e66710@pc33.atlanta.com
CSeq: 314159 INVITE
Contact: <sip:alice@pc33.atlanta.com>
Content-Type: application/sdp
Content-Length: 142

Figure 5:
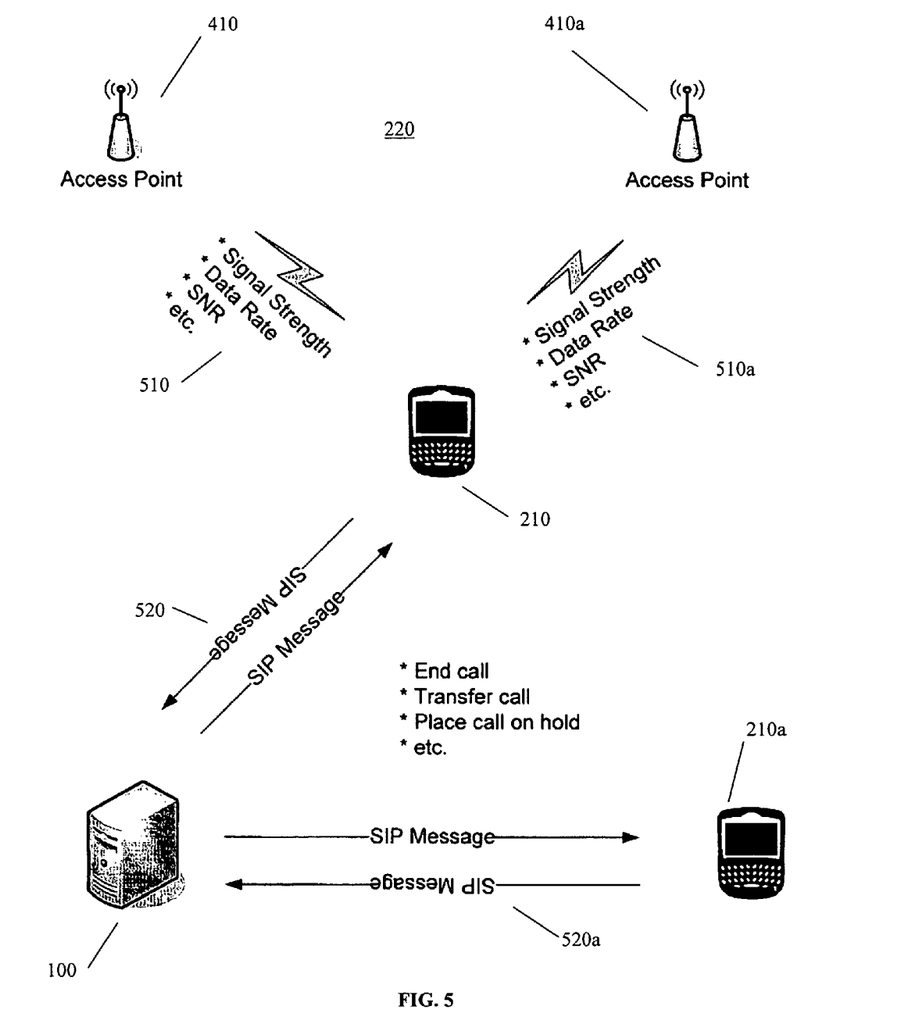
FIG. 5 is a block diagram illustrating signaling between wireless devices and a session initiation protocol ("SIP") proxy server in accordance with an embodiment of the application; and, FIG. 6 is a flow chart illustrating operations of software modules within the memory of a server for signalling the transfer of a voice call communicated between a wireless device and a second device from a first access point to a second access point in a wireless network, the second device coupled to the first and second access points through the server, in accordance with an embodiment of the application.

FIG. 5 is a block diagram illustrating signalling between wireless devices 210, 210a and a session initiation protocol ("SIP") proxy server 100 in accordance with an embodiment of the application. As mentioned above, one problem with communications in a WLAN 220 occurs when a wireless device 210 transfers between first and second access points 410, 410a in the WLAN 220 during voice calls. In particular, when a wireless device 210 user roams around the wireless environment (e.g., a floor in an office building serviced by a WLAN 220) during a voice call taking place over the WLAN 220, the wireless connection may not necessarily be always available. For example, if the user is participating in a voice call through his/her wireless device 210 while connected to a first access point 410 to the WLAN 220 and then walks across to the other side of the floor, the user's wireless device 210 may need to transfer over to a second access point 410a to continue with the voice call. While it is possible for the transfer between access points 410, 410a to be seamless, there are many occasions when the WLAN 220 coverage is not seamless and hence there will be a period of time when the user's wireless device 210 will be without any wireless connection. Currently, this would mean that the voice call could be interrupted or abruptly dropped.

Now, the present application provides a system and method for facilitating the transition of voice calls between access points 410, 410a on a WLAN 220. According to one embodiment, the wireless device 210 monitors its WLAN radio signal 510, 510a characteristics such as signal strength, data rate, signal-to-noise ratio ("SNR"), echo level, jitter metric, packet concealment rate, packet loss rate, retransmission rate, subnet address, etc. For reference, packet concealment occurs when packet loss occurs and a "fake" packet is created to "conceal" the missing packet. Thus, too many losses is an indicator of poor quality. By interpreting the characteristics of these signals 510, 510a (e.g., by comparing to stored values, etc.), the wireless device 210 determines the quality of its radio link to each access point 410, 410a. If a first wireless device 210 determines that it is time to transfer or roam from a first access point 410 to a second access point 410a, an indication of the pending transfer is included in SIP messages 520, 520a exchanged between the first wireless device 210 and a second wireless device 210a (or other device) in voice call communication therewith through the SIP proxy server 100. According to one embodiment, these messages 520, 520a provide an indication to the receiving wireless device 210a (or other device) that an interruption in the voice call due to an access point transfer may occur. According to another embodiment, the messages 520, 520a provide an indication to the SIP proxy server 100 that an interruption in the voice call due to an access point transfer may occur allowing the SIP proxy server 100 to intervene and place the call on hold, end the call, transfer the call, etc. According to another embodiment, the first wireless device 210 may be a dual-mode wireless device operable on both the wireless network 220 and a cellular network. According to another embodiment, the messages 520, 520a provide an indication to the SIP proxy server 100 that an interruption in the voice call due to an access point transfer may occur allowing the SIP proxy server 100 to intervene and transfer the call to the cellular network. According to one embodiment, the messages 520, 520a are modified SIP "INFO" messages. These messages are modified to indicate a pending action (e.g., drop, transfer, hold, etc.) and may be implemented by a modification to the existing SIP INFO message standard or by the introduction of a new message to the SIP message standards.

The application provides several advantages over prior methods. In cellular networks, for example, radio characteristics are used to determine when a transfer between cells should occur (which may occur during on a call). In a cellular environment, it is assumed that the call will be picked up immediately and appear seamless to all users. In contrast, in a WLAN environment, that is not always the case. However, by using the proxy server 100 and SIP to handle call flow and including an indication of a pending access point transfer, the proxy server 100 can handle a wider range of scenarios including transferring, ending, or holding the call.

Figure 6:
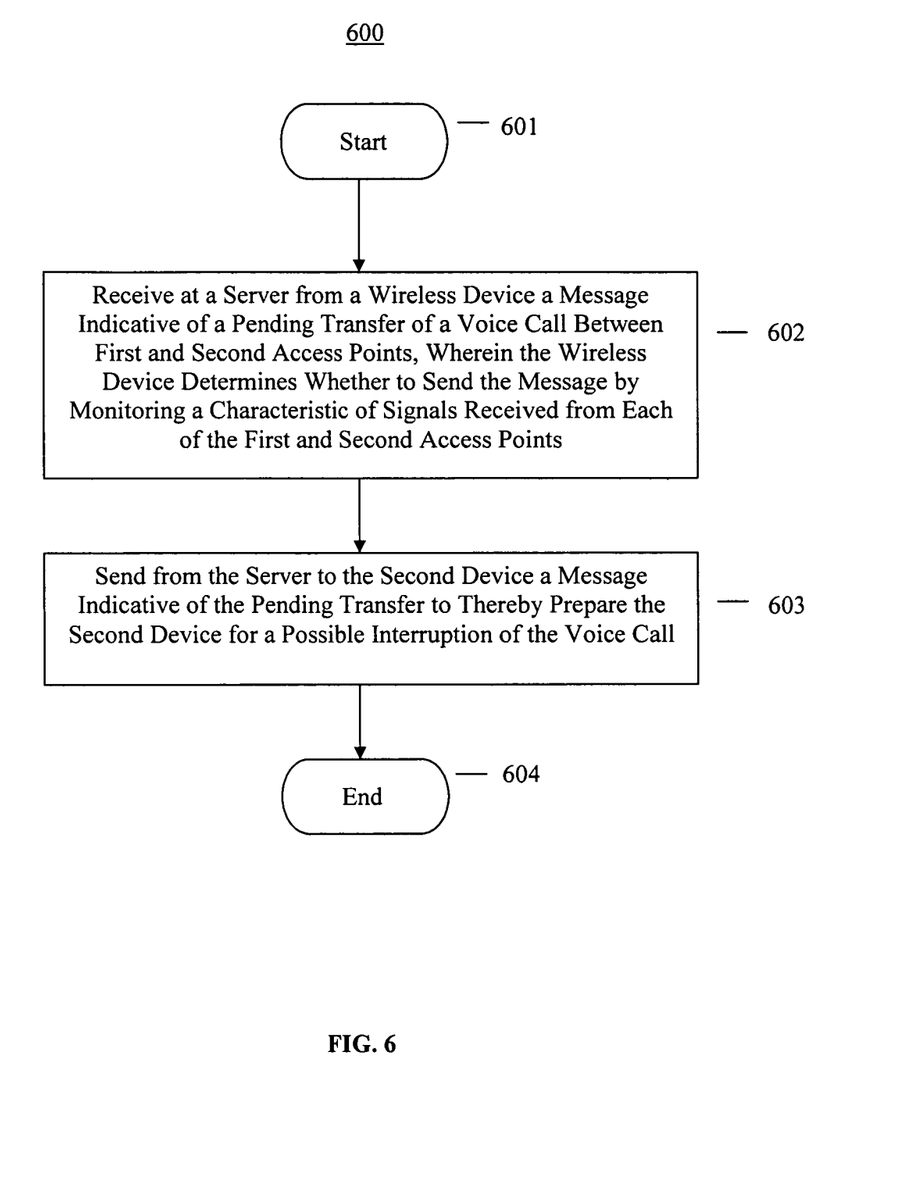

The above described method may be summarized with the aid of a flowchart. FIG. 6 is a flow chart illustrating operations 600 of software modules 170 within the memory 130 of a server 100 (or data processing system 100) for signalling a transfer of a voice call communicated between a wireless device 210 and a second device 210a, 470 from a first access point 410 to a second access point 410a in a wireless network 220, the second device coupled 210a, 470 to the first and second access points 410, 410a through the server 100, in accordance with an embodiment of the application.

At step 601, the operations 600 start.

At step 602, a message 520 indicative of a pending transfer between the first and second access points 410, 410a is received at the server 100 from the wireless device 210, wherein the wireless device 210 determines whether to send the message by monitoring a characteristic of signals 510, 510a received from each of the first and second access points 410, 410a.

At step 603, a message 520a indicative of the pending transfer is sent from the server 100 to the second device 210a, 470 to thereby prepare the second device 210a, 470 for a possible interruption of the voice call.

At step 604, the operations 600 end.

The method may further include, in response to the message 520 from the wireless device 210, one of the server 100 ending the call, transferring the call to another device, and placing the call on hold. The wireless network 220 may be a wireless local area network 220. The second device 210a, 470 may be a second wireless device 210a. The second device 210a may be any voice-enabled device (e.g., a wired telephone handset 470, wireless cellular device, etc.) coupled to the server 100 through a private branch exchange ("PBX") 450. The server 100 may be a session initiation protocol ("SIP") server 100 and the messages 420, 420*a* may be SIP messages. The characteristic may be at least one of signal strength, data rate, signal-to-noise ratio, echo level, jitter metric, packet concealment rate, packet loss rate, retransmission rate, and subnet address. The wireless device 210 may be a dual-mode wireless device operable on both the wireless network 220 and a cellular network. And, the method may further include, in response to the message from the wireless device 210, the server 100 transferring the call to the cellular network.

The above described method is generally performed by the data processing system 100. However, according to an alternate embodiment, the method can be performed by the wireless device 210.

While embodiments of this application are primarily discussed as a method, a person of ordinary skill in the art will understand that the apparatus discussed above with reference to a wireless device 210 and a data processing system 100, may be programmed to enable the practice of the method of these embodiments. Moreover, an article of manufacture for use with a wireless device 210 or data processing system 100, such as a pre-recorded storage device or other similar computer readable medium including program instructions recorded thereon, may direct the wireless device 210 or data processing system 100 to facilitate the practice of the method of these embodiments. It is understood that such apparatus and articles of manufacture also come within the scope of the application.

The embodiments of the application described above are intended to be exemplary only. Those skilled in this art will understand that various modifications of detail may be made to these embodiments, all of which come within the scope of the application.

What is claimed is:

1. A method for signalling a transfer of a voice call communicated between a wireless device and a second device from a first access point in a wireless local area network to a second access point in the wireless local area network, the method comprising:
    receiving from the wireless device, at a session initiation protocol ("SIP") server that couples the wireless device to the first and second access points, a message destined for the second device indicative of a pending transfer between the first and second access points that are in communication with the second device in the wireless local area network, wherein the wireless device determines whether to send the message by monitoring at least one of a signal strength, a data rate, a signal to noise ratio, an echo level, a jitter-buffer rate, a packet concealment rate, a packet loss rate and a retransmission rate of signals received from each of the first and second access points;
    sending from the server to the second device a modified SIP "INFO" message indicative of
        the pending transfer to thereby prepare the second device for an interruption of the voice call; and
        the interruption of the voice call due to an access point transfer between the first and second access points; and
    either placing the voice call on hold, ending the voice call, or transferring the voice call by the server.

2. The method of claim 1 wherein, in response to receiving the message from the wireless device, the server ends the voice call and transfers the voice call to another device.

3. The method of claim 1 wherein the second device is a second wireless device.

4. The method of claim 1 wherein the second device is any voice-enabled device coupled to the server through a private branch exchange ("PBX").

5. The method of claim 1 wherein the modified SIP "INFO" message is a modification of the an existing SIP INFO message standard.

6. The method of claim 1 wherein the wireless device is a dual-mode wireless device operable on both the wireless local area network and a cellular network.

7. The method of claim 6 wherein, in response to receiving the message from the wireless device, the server transfers the voice call to the cellular network.

8. A server for signalling a transfer of a voice call communicated between a wireless device and a second device from a first access point in a wireless local area network to a second access point in the wireless local area network, the server comprising:
    a processor coupled to the wireless local area network;
    a memory device; and,
    a program executed by the processor, the program including:
        a module for receiving from the wireless device a message destined for the second device indicative of a pending transfer between the first and second access points in the wireless local area network, wherein the wireless device determines whether to send the message by monitoring at least one of a signal strength, a data rate, a signal to noise ratio, an echo level, a jitter-buffer rate, a packet concealment rate, a packet loss rate and a retransmission rate of signals received from each of the first and second access points;
        a module for sending to the second device a modified SIP "INFO" message indicative of
            the pending transfer to thereby prepare the second device for an interruption of the voice call; and
            the interruption of the voice call due to the pending transfer; and
        a module to intervene on the voice call to either place the voice call on hold, end the voice call, or transfer the voice call when the modified SIP "INFO" message is sent.

9. The server of claim 8 wherein the module to intervene, in response to the message from the wireless device ends the voice call and transfers the voice call to another device.

10. The server of claim 8 wherein the second device is a second wireless device.

11. The server of claim 8 wherein the second device is any voice-enabled device coupled to the system through a private branch exchange ("PBX").

12. The system of claim 8 wherein the modified SIP "INFO" message is a modification of an existing SIP INFO message standard.

13. The server of claim 8 wherein the wireless device is a dual-mode wireless device operable on both the wireless local area network and a cellular network.

14. The server of claim 13 wherein the module to intervene, in response to the message from the wireless device, transfers the voice call to the cellular network.

15. A computer program product having computer executable code for directing a session initiation protocol ("SIP") server to signal a transfer of a voice call communicated between a wireless device and a second device from a first access point in a wireless local area network to a second access point in the wireless local area network, the code comprising:
    code for receiving at the server from the wireless device a message destined for the second device indicative of a pending transfer between the first and second access points in the wireless local area network, wherein the wireless device determines whether to send the message by monitoring at least one of a signal strength, a data rate, a signal to noise ratio, an echo level, a jitter-buffer rate, a packet concealment rate, a packet loss rate and a retransmission rate of signals received from each of the first and second access points;

code for sending from the server to the second device a modified SIP "INFO" message indicative of
the pending transfer to thereby prepare the second device for an interruption of the voice call; and
the interruption of the voice call due the pending transfer; and code for the server module to intervene on the voice call for either placing the voice call on hold, ending the voice call, or transferring the voice call when the modified SIP "INFO" message is sent.

16. The computer program product of claim 15 and further comprising code for, in response to the message from the wireless device, one of the server ending the call and transferring the call to another device.

17. The computer program product of claim 15 wherein the second device is a second wireless device.

18. The computer program product of claim 15 wherein the second device is any voice-enabled device coupled to the server through a private branch exchange ("PBX").

19. The computer program product of claim 15 wherein the modified SIP "INFO" message is a modification of an existing SIP INFO message standard.

20. The computer program product of claim 15 wherein the wireless device is a dual-mode wireless device operable on both the wireless local area network and a cellular network.

21. The computer program product of claim 20 wherein the code for the server module to intervene, in response to receiving the message from the wireless device, transfers the voice call to the cellular network.

22. The method of claim 1 wherein, in response to receiving the message from the wireless device, the server places the voice call on hold.

23. The server of claim 8 wherein, the module to intervene, in response to receiving the message from the wireless device, places the voice call on hold.

24. The computer program product of claim 15 wherein the code for the server module to intervene, in response to receiving the message from the wireless device, places the voice call on hold.

* * * * *